United States Patent
Varadarajan et al.

(10) Patent No.: US 9,361,619 B2
(45) Date of Patent: Jun. 7, 2016

(54) SECURE AND CONVENIENT MOBILE AUTHENTICATION TECHNIQUES

(75) Inventors: Rammohan Varadarajan, Sunnyvale, CA (US); Ambarish Malpani, Palo Alto, CA (US)

(73) Assignee: CA, Inc., New York, NY (US)

( * ) Notice: Subject to any disclaimer, the term of this patent is extended or adjusted under 35 U.S.C. 154(b) by 976 days.

(21) Appl. No.: 13/567,805

(22) Filed: Aug. 6, 2012

(65) Prior Publication Data
US 2014/0040147 A1 Feb. 6, 2014

(51) Int. Cl.
G06Q 20/38 (2012.01)
G06Q 20/40 (2012.01)
H04L 9/08 (2006.01)
H04L 29/06 (2006.01)
G06Q 20/22 (2012.01)
G06F 21/31 (2013.01)

(52) U.S. Cl.
CPC ............ *G06Q 20/3829* (2013.01); *G06F 21/31* (2013.01); *G06Q 20/227* (2013.01); *G06Q 20/3823* (2013.01); *G06Q 20/405* (2013.01); *G06Q 20/4016* (2013.01); *H04L 9/088* (2013.01); *H04L 63/0853* (2013.01); *G06F 2221/2113* (2013.01); *H04L 2209/56* (2013.01); *H04L 2463/062* (2013.01); *H04L 2463/082* (2013.01)

(58) Field of Classification Search
CPC ................................................ H04L 2456/062
USPC ...................................................... 705/50–79
See application file for complete search history.

(56) References Cited

U.S. PATENT DOCUMENTS

| | | | | |
|---|---|---|---|---|
| 5,604,801 A | * | 2/1997 | Dolan | H04L 9/0822 380/277 |
| 6,170,058 B1 | * | 1/2001 | Kausik | G06F 21/6245 705/71 |
| 2009/0152343 A1 | * | 6/2009 | Carter | G06Q 10/0633 235/379 |
| 2012/0240195 A1 | * | 9/2012 | Weiss | H04L 63/0846 726/4 |

OTHER PUBLICATIONS

Hoover, D. N., et al., "Software Smart Cards via Cryptographic Camouflage," Proceedings of the 1999 IEEE Symposium on Security and Privacy (S&P '99), IEEE Computer Society, May 9-12, 1999, available at http://www.ca.com/us/collateral/white-papers/na/software-smart-cards-via-cryptographic-camouflage.aspx.

* cited by examiner

*Primary Examiner* — Calvin L Hewitt, II
*Assistant Examiner* — Margaret Neubig
(74) *Attorney, Agent, or Firm* — Baker Botts L.L.P.

(57) ABSTRACT

Security and convenience are provided by a system, apparatus, method, and computer program product that stores two or more encryption keys that correspond to two or more levels of authentication. The encryption keys may be encrypted and decrypted utilizing an endorsement key and trusted computing techniques. Or the encryption keys may be stored in a secure manner utilizing key protection techniques, such as cryptographic camouflaging. A first encryption key is recovered automatically for the first level of authentication. And input is requested to recover the second encryption key for the second level of authentication.

24 Claims, 3 Drawing Sheets

SECURE AND CONVENIENT MOBILE AUTHENTICATION TECHNIQUES

BACKGROUND

The present disclosure generally relates to mobile authentication techniques. The disclosed embodiments relate more specifically to a system, apparatus, method, and computer program product for providing security and convenience in mobile authentication.

As society becomes more mobile and fast-paced, the use of currency (e.g., cash) increasingly is being replaced with electronic transactions using credit cards, debit cards, electronic checks, and automatic teller machines (ATMs). To further hasten such transactions, the Merchant Service Providers (MSPs) that provide transaction processing solutions to merchants often pre-arrange with those merchants to accept credit card and debit card transactions up to a certain dollar amount without requiring a customer to sign a receipt. Also known as Quick Sale Retail (QSR) transactions, such transactions benefit both the customer and the merchant—the customer is not bothered with signing the receipt and the merchant can move customers more quickly through a check-out line.

Despite the conveniences provided by QSR transactions, credit cards and debit cards have certain security vulnerabilities. In order to complete a card-based transaction, a user must provide a primary account number (PAN) and a verification value, sometimes referred to as a Card Verification Value (CVV or CV2), Card Verification Code (CVC), or Card Security Code (CSC). The PAN a fifteen-digit or sixteen-digit series of human-readable characters that is embossed on the front of the card and generally is used to identify a particular customer. And credit cards and debit cards typically are provided with two verification values: 1) a first verification value encoded into the magnetic stripe ("magstripe") on the card and 2) a second verification value printed on the front or back of the card, typically as a three-digit or four-digit series of human-readable characters.

The first verification value generally is used to conduct "card present" transactions in which the user presents the card in person so the first verification value can be read directly from magstripe by a card reader (e.g., point of sale (POS) transactions). And the PAN and second verification code generally are used to verify that a customer has the card in his/her possession during "card not present" transactions in which the first verification value cannot be read directly from magstripe (e.g., an Internet transaction, a telephone transaction, etc.). Thus, either the first verification value or the PAN in combination with the second verification generally are used to ensure that only authorized users conduct transactions with a credit card or debit card.

The security of the PAN, the first verification value, and the second verification value can be compromised in a number of ways, which is compounded by the static nature of that account information. To combat such security risks, consortiums have developed global standards for credit card and debit card payments based on chip card technology. For example, the EuroPay, MasterCard, and Visa (EMV) consortium has defined a standardized smart card that works with standardized smart card readers, cryptograms, etc. Smart cards are credit-card sized cards that contain a microprocessor and memory. EMV's smart cards use symmetric key cryptography for signature and authentication, wherein a provisioning server and an authenticating server each have a copy of a Triple Data Encryption Standard (Triple-DES) Master Derivation Key (MDK) in hardware. And when a particular user is identified by his/her PAN, the provisioning server applies the MDK to the PAN and generates two symmetric DES keys (e.g., a Unique DEA Key A (UDKA) and a Unique DEA Key B (UDKB)), which go into the smart card for that user. At present, it is widely believed that DES keys are best stored by physically isolating them in the smart card's hardware (e.g., written them onto the Chipcard's memory).

When conducting a transaction with a smart card, a user may be required to enter a personal identification number (PIN) and/or a one-time passcode (OTP) to access the DES keys in that user's smart card. The smart card's microprocessor then uses that authentication information and a random number to generate a cryptogram, called an Authorization Request Cryptogram (ARQC), which it digitally "signs" with the two DES keys. That authentication information is sent to the authenticating server where it is used to recreate the cryptogram and, if it matches the ARQC from the smart card and the OTP entered by the user (if an OTP is required), the purchase is approved and an application transaction counter (ATC) is incremented on both the smart card and the authentication server.

An ATC on the smart card and an ATC on the authentication server are incremented each time a transaction is completed to ensure that a fresh OTP is provided (if an OTP is required) and to guard against certain types of attacks, such as a replay attack. If the ATC on the smart card and an ATC on the authentication server get out of synch, the smart card and/or card reader will be locked until the client ATC and server ATC are resynchronized. The smart card also may be locked if a user enters the wrong PIN a predetermined number of times in a row. Unlocking the smart card may require contacting the card provider or entering a pin unblock key (PUK). Unlocking the smart card may even require reissuance of the smart card.

BRIEF SUMMARY

The present disclosure is directed to system, apparatus, method, and computer program product for performing user authentications. According to one aspect of the present disclosure, the apparatus comprises a processor configured to execute computer-readable program code, an endorsement key that is provided in hardware of the apparatus and that is shared with trusted software, and a memory. The memory comprises computer-readable program code configured to recover and decrypt the encryption key with the endorsement key automatically for a first level of authentication when the one or more encryption key is requested by the trusted software, and computer-readable program code configured to request an input, to recover the endorsement key when the input is received, and to recover and decrypt the encryption key with the endorsement key for a second level of authentication when the one or more encryption key is requested by the trusted software.

According to another aspect of the present disclosure, the apparatus comprises a processor configured to execute computer-readable program code and a memory. The memory comprises computer-readable program code configured to store a first encryption key associated with a first level of authentication and a second encryption key associated with a second level of authentication; computer-readable program code configured to recover the first encryption key when the first level of authentication is required; and computer-readable program code configured to request an input when the second level of authentication is required and to recover the second encryption key when the input is received.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

As will be appreciated by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The system, apparatus, method, and computer program product of the disclosed embodiments provide security and convenience in mobile authentication by utilizing multiple keys and/or trusted software to support those authentications. More particularly, the system, apparatus, method, and computer program product provide security by utilizing different software-based keys for different levels of authentication and/or by utilizing trusted computing techniques to prevent anything outside of a trusted computing base (TCB) from accessing a user's keys. The user's keys also may be protected using other techniques, such as cryptographic camouflage. And the system, apparatus, method, and computer program product provide convenience because such authentication techniques can be utilized in various types of mobile authentication (e.g., financial transactions, Internet accesses, facility accesses, file accesses, etc.) without the need for additional hardware (e.g., a smart card's processor and memory, a Hardware Security Module (HSM), etc.).

Figure 1:
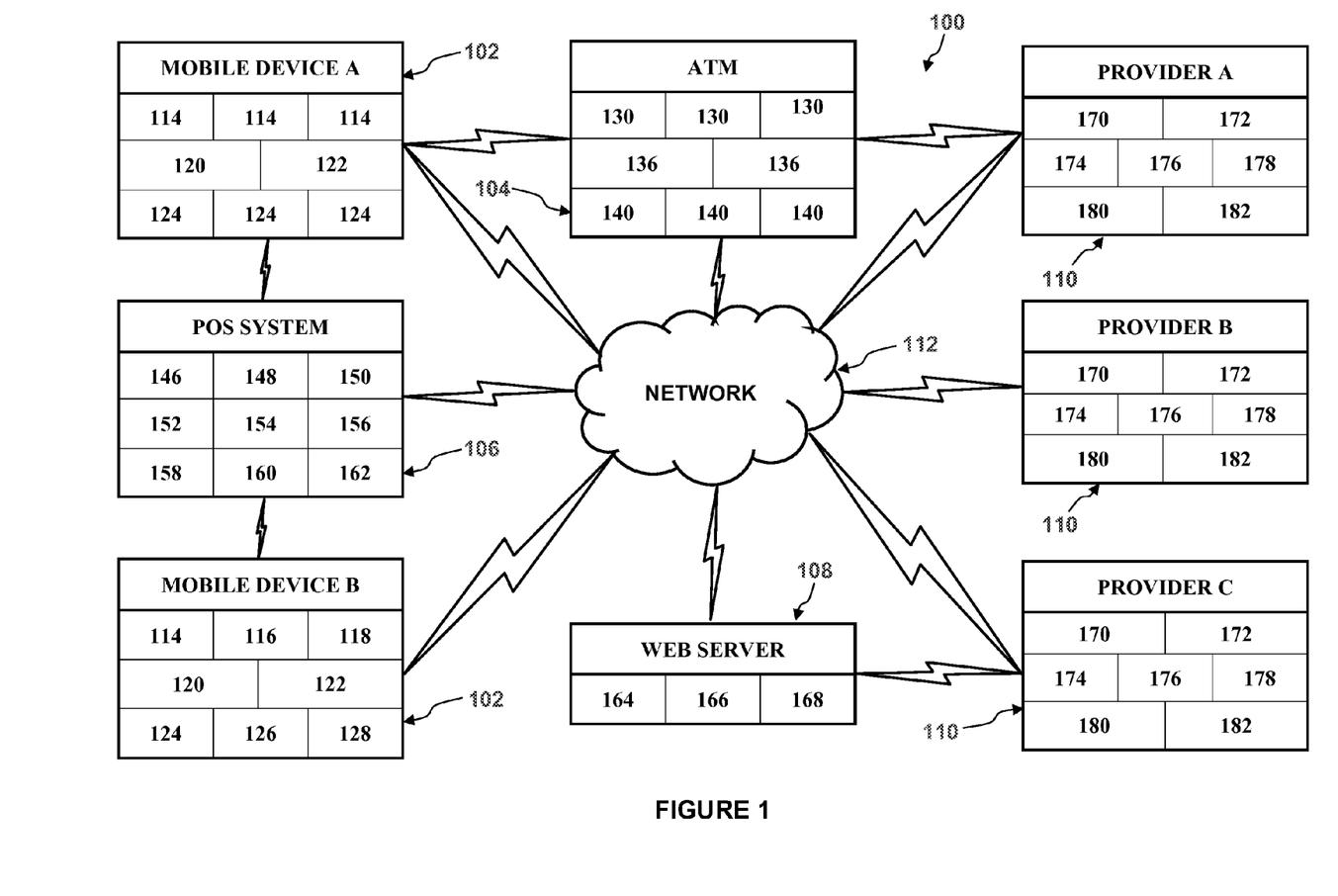
FIG. 1 is a schematic diagram illustrating an example of a communications network according to a non-limiting embodiment of the present disclosure.

Turning to the drawings, FIG. 1 illustrates a communications network 100 according to a non-limiting embodiment of the present disclosure. The communications network 100 includes two (2) mobile devices 102 (i.e., Mobile Device A and Mobile Device B), an ATM 104, a POS system 106, a web server 108, and three (3) provider systems 110 (i.e., Provider A, Provider B, and Provider C). Nevertheless, it should be understood that the communications network 100 is illustrative only and could include any number of each of those network devices 102-110, as well as other network devices (e.g., a personal computer, a laptop computer, etc.). Those network devices 102-110 are configured to communicate with each other via a network connection 112. And the network connection 112 may be any suitable wired or wireless connection that supports such communications, including a cellular network connection (e.g., a Global System for Mobile Communications (GSM) connection, a Code Division Multiple Access (CDMA) connection, a Long Term Evolution (LTE) connection, etc.), a LAN connection, a wireless LAN (WLAN) connection, a WAN connection, or a combination of two or more of those network connections.

Each mobile device 102 includes a processor 114, a memory 116, an input device 118, an output device 120, a proximal device interface 122, a network interface 124, a key wallet module 126, and a payment application 128. Each mobile device 102 also may include an antenna (not shown), a specialized digital signal processor (DSP) (not shown), and a Subscriber Identity Module (SIM) card (not shown) or a Removable User Identity Module (R-UIM) card that are configured to support wireless, bi-directional telecommunications between that mobile device 102 (e.g., Mobile Device A) and another mobile device 102 (e.g., Mobile Device B), such as via a cellular network. Accordingly, each mobile device 102 may be a tablet computer, a smart phone, a personal digital assistant (PDA), or other similar device.

The processor 114 may include any number of suitable CPUs that are configured to execute the computer program code embodied on the memory 116 and to perform the various functions of the mobile device 102 described in more detail below. The memory 116 may include one or more types of memory (e.g., ROM, RAM, EEPROM, etc.) as required to store the computer program code executed by the processor 114 and to support the execution of that code. For example, the memory 116 may store the computer program code that is executed by the processor 114 to provide the functionality of the key wallet module 126 and the payment application 128.

The input device 118 may include any number of suitable devices that are configured to receive input from a user (e.g., a keypad, a microphone, a camera, a retinal scanner, a print pad, an electronic receiver, a touch screen, etc.). The output device 120 may include any number of suitable devices that are configured to output data to a user in a meaningful manner (e.g., a display, a printer, a speaker, etc.). The proximal device interface 122 may include any number of suitable contactless or a wireless interfaces that utilize contactless communication technology (e.g., RFID, BLUETOOTH brand contactless communication technology, transponders, proximity card communication techniques, etc.) to communicate with one more of the ATM 104, the POS system 106, and/or the web server 209 when the mobile device 102 is in proximity of the ATM 104, the POS system 106, and/or the web server 209. And the network interface 124 may include any number of suitable interfaces that are configured to support communications with the various network devices 102-112 of the communications network 100 via the network connection 112 (e.g., modem, mobile browser, wireless Internet browser, etc.).

The key wallet module 126 is configured to store software-based encryption keys in a secure manner and to encrypt messages utilizing those encryption keys to form digital signatures. When employed utilizing multiple key authentication, the key wallet module 126 is configured to store a plurality of encryption keys that correspond to different levels of authentication. Those encryption keys are stored in a secure manner by the key wallet module 126 utilizing any number of key protection techniques. As one example, cryptographic camouflaging may be utilized to prevent each such encryption key from being recovered without inputting a corresponding key PIN (e.g., a six-digit series of human-readable characters). Cryptographic camouflaging is disclosed, for example, in U.S. Pat. No. 6,170,058 to Balas Kausik, the disclosure of which is hereby incorporated by reference as if fully set forth herein.

When utilizing the cryptographic camouflaging key protection technique, the key wallet module 126 embeds each of the user's encryption keys among spurious but plausible candidate keys. For example, of the 1,000,000 possible six-digit key PINS that may be used to recover the user's encryption key from the key wallet module 126, 10,000 of them may result in the generation of an incorrect candidate key with the same data structure as the user's correct encryption key. Only one of the resulting 10,000 candidate keys, however, will be the user's correct encryption key. The other candidate keys will be incorrect keys that will look just as plausible as the correct encryption key because they share the same data structure (e.g., a fifteen-digit series of human-readable characters), such that the correct encryption key is metaphorically "camouflaged" among the incorrect candidate keys. An attacker who recovers a candidate key, rather than the correct encryption key, will not be able to distinguish that candidate key from the correct encryption key until he/she tries to use that candidate key to authenticate a message, which will ultimately fail when the candidate key is not the correct encryption key.

It should be understood that other key protection techniques also may be used to store a user's encryption keys in a secure manner. Such key protection techniques may be utilized to store a plurality of different encryption keys that correspond to different levels of authentication in a secure manner without the need for trusted computing techniques. Nevertheless, trusted computing techniques may be utilized in place of or in addition to such key protection techniques to protect a user's encryption keys from unauthorized access.

When trusted computing techniques are utilized to protect a user's encryption keys from unauthorized access, the key wallet module 126 stores a user's encryption keys in a secure manner by utilizing a pair of endorsement keys to encrypt those encryption keys. Those endorsement keys are created randomly on the hardware of the mobile device 102 at manufacture and include a hardware-based private key that never leaves the hardware of the mobile device 102 and a public key that is used for attestation and for encryption of messages within a TCB. The key wallet module 126 utilizes those endorsements keys to sign a random number using a predetermined protocol (e.g., the Direct Anonymous Attestation Protocol created by the Trusted Computing Group) so as to uniquely identify the mobile device 102 and establish that it is a genuine trusted device within the TCB, thereby making it difficult for the mobile device 102 to be emulated with an non-trusted endorsement key. The key wallet module 126 also may store other authentication information in a similar manner.

Encryption keys and other authentication information that is protected utilizing such trusted computing techniques is accessible only by trusted software obtained from trusted vendors. Thus, the payment application 128 may be implemented as trusted software. And for an entity (e.g., the ATM 104, POS system 106, web server 108, provider system 110, etc.) to be considered "trusted," it also must utilize trusted software to interact with the mobile device 102.

Such trusted computing techniques may be utilized to store a plurality of different keys in a secure manner without the need for providing different encryption keys for different levels of authentication. Instead, the trusted software can automatically recover a single encryption key based on different numbers and types of inputs that are defined for different risks associated with different levels of authentication. Nevertheless, trusted software techniques also may be utilized to further protect a user's encryption keys from unauthorized access when multiple key authentication is utilized. For example, trusted software may automatically recover one of a plurality of different encryption keys utilizing the different numbers and types of inputs that are required to recover that particular encryption key based on the risks associated with the corresponding level of authentication.

To facilitate different types of electronic transactions, the payment application 128 also is configured to include and/or access the account information (e.g., PANs, first verification values, second verification values, etc.) and the authentication information (e.g., pseudo-public key certificates, encryption keys, key PINS, etc.) for a plurality of different accounts (e.g., bank accounts, credit card accounts, merchant accounts, etc.) that a user may utilize to conduct those transactions. Accordingly, the user may select between those different accounts to perform different financial transactions at the ATM 104, the POS system 106, or the web server 108, as desired. The payment application 128 also may be configured to conduct electronic transactions between one mobile device 102 (e.g., Mobile Device A) and another mobile device (e.g., Mobile Device B) utilizing those different accounts.

In addition, the payment application 128 may be configured to allow the user to define different rules for authenticating different financial transactions. A user may define such rules to pre-authorize, limit, or restrict different electronic transactions based on various conditions, such as an individual transaction amount, an aggregate amount for one or more transaction conducted over a predetermined time period, a geographic area, a merchant, a product type, or a particular account. For example, the user may pre-authorize each individual electronic transaction with a total dollar amount less than or equal to a threshold value (e.g., $100), which provides users with the ability to establish user-defined, rather than MSP-defined, QSR-type transactions. A user may prevent any additional transactions from being authorized after a predetermined, aggregate dollar amount is reached in a predetermined period of time (e.g., $1000/month), which provides users with the ability to limit their spending to a specific budget. A user may restrict transactions by geographic area (e.g., a particular zip code) and/or merchant (e.g., grocery stores only), which provides users with the ability to limit the number of locations at which certain users can make purchases (e.g., only grocery stores at or near a college campus). And a user may restrict the types of purchases made by different users based on the product type (e.g., no alcohol), which provides users with the ability to prevent certain users from making unlawful or unauthorized purchases. Each of those rules can be established on an account-by-account basis.

The various rules that are defined with the payment application 128 may be associated with user-specific access PINs, wherein a user must enter his/her own respective access PIN to access the electronic payment functionality of the mobile device 102. Accordingly, only certain rules may be applied to that user's transactions based on the access PIN entered, while other rules would be applied to other users' transaction based on their respective access PINS. Similarly, different numbers and types of inputs may be required to authenticate different transactions based on the rules associated with those transactions. For example, for transactions greater than a predetermined dollar amount and/or for a particular type of product, the user may be required to input a six-digit key PIN and answer a security question. And for transactions less than or equal to a predetermined dollar amount or within a particular geographic area, the user may not need to provide any input. Such user input can be made via the input device 118 of the mobile device 120, the input device 134 of the ATM 104, and/or the input device 150 of the POS system 106.

Figure 2:
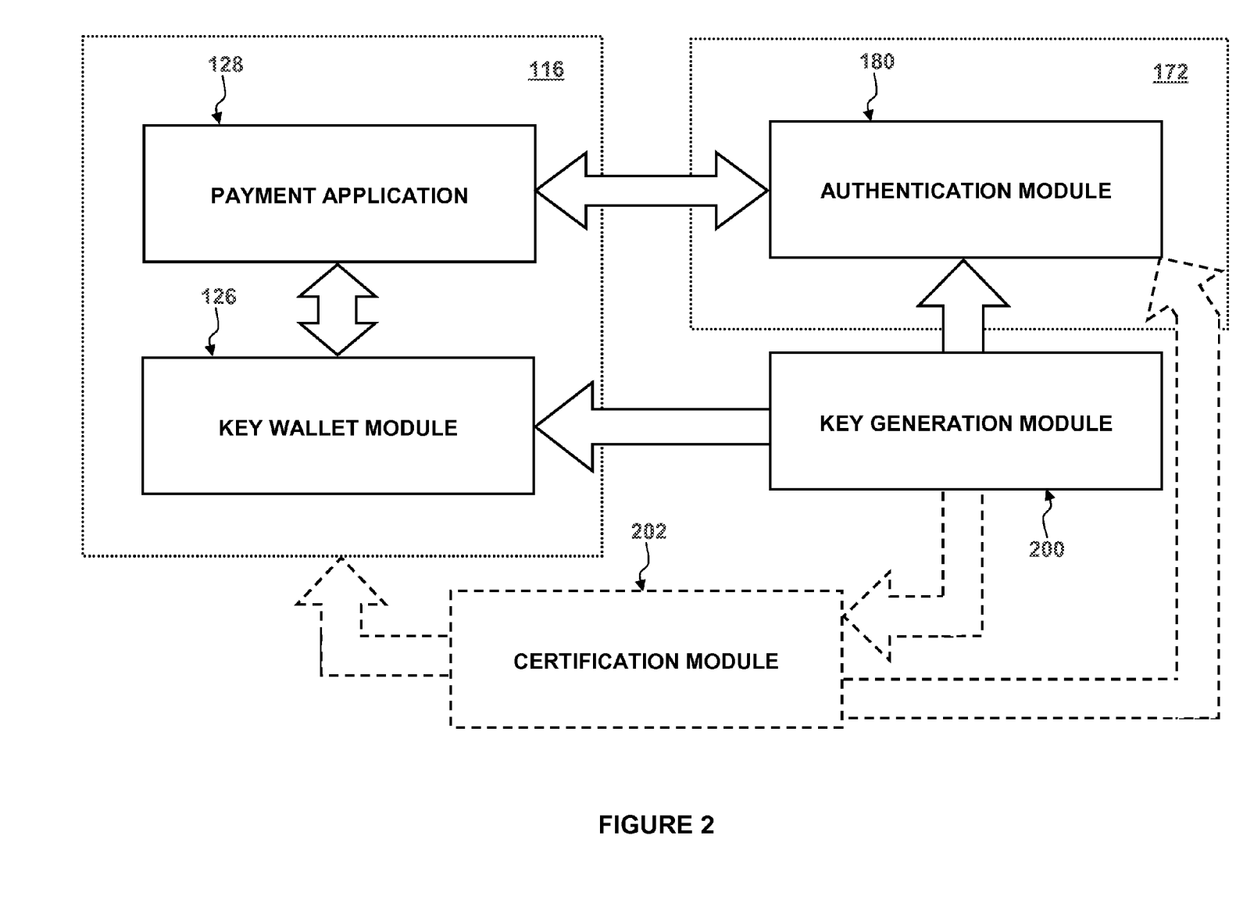
FIG. 2 is a schematic diagram illustrating an example of a key wallet module, a payment application, a key generation module, an authentication module, and a certification module according to a non-limiting embodiment of the present disclosure.

As illustrated in FIG. 2, the key wallet module 126 and the payment application 128 are stored on the memory 116 of the mobile device 102. The key wallet module 126 of the mobile device 102 works in conjunction with a key generation module 200 and an authentication module 180 to ensure that the mobile device 102 communicates securely with a provider system 110, either directly via its network interface 124 or indirectly through the ATM 104, the POS system 106, or the web server 108 via its proximal device interface 122. And when the mobile device 102 communicates with a provider system 110 utilizing asymmetric encryption, the key wallet module 126 and authentication module 180 also may work in conjunction with a certification module 202. As described in more detail below with respect to the provider systems 110, the key generation module 200 generates shared encryption keys when symmetric encryption is utilized, or pairs of private and pseudo-public encryption keys when asymmetric encryption is utilized; the authentication module 180 uses those shared encryption keys or private encryption keys to verify the digital signatures formed by the key wallet module 126; and the certification module 202 creates pseudo-pubic key certificates that include the pseudo-public encryption keys created by the key generation module 200.

In operation, the processor 114, memory 116, input device 118, output device 120, proximal device interface 122, network interface 124, key wallet module 126, and payment application 128 of the mobile device work in conjunction with each other to authenticate electronic transactions with another mobile device 102, the ATM 104, the POS system 106, and/or the web server 209. For example, the output device 120 (e.g., a display) may display a menu and related information associated with an electronic transaction. A portion of that information may be selected and/or additional information may be input into the mobile device 102 via the input device 118 (e.g., a touch screen). The processor 114 may execute the computer program code embodied on the memory 116 to provide the foregoing functionality and to communicate with another mobile device 102, the ATM 104, the POS system 106, and/or the web server 209 via the proximal device interface 122 and/or the network interface 124. The key wallet module 126 stores the user's encryption keys in a secure manner, such as by cryptographic camouflaging techniques and/or trusted computing techniques. The key wallet module 126 then recovers those encryption keys and utilizes them to encrypt the transaction information transmitted during those electronic transactions by forming a unique digital signature on the transmitted transaction information. Such mobile authentication techniques provide a significant number of security advantages in a convenient, mobile environment.

Returning to FIG. 1, the ATM 104 includes a processor 130, a memory 132, an input device 134, an output device 136, a proximal device interface 138, a network interface 140, a card reader 142, and a currency dispenser 144. The processor 130, memory 132, input device 134, output device 136, proximal device interface 138, and network interface 140 of the ATM 104 may be configured in a similar manner to that described above with respect to the processor 114, memory 116, input device 118, output device 120, proximal device interface 122, and network interface 124 of the mobile device 102, respectively. As would be understood by those of ordinary skill in the art, however, the configurations of the processor 130, memory 132, input device 134, output device 136, proximal device interface 138, and network interface 140 of the ATM 104 may be modified as required to support the functionality of the ATM 104 described below. The ATM 104 also may include a printer (not shown) that is configured to print a transaction receipt and a receiving mechanism (not shown) that is configured receive paper based items, such as negotiable documents, checks, bank drafts, deposits, and printed communications.

The card reader 142 may be any suitable device that is configured to directly read a first verification value (e.g., a CVV, a CVC, a CSC, etc.) from a card (e.g., a credit card, a debit card, a bank card, etc.). For example, the first verification value may be read from a magstripe on the card when the card is swiped past a magnetic reader in the card reader 142, or the first verification value may be read from an RFID tag on the card when the card is placed in close proximity of an RFID tag reader in the card reader 142. The card reader 142 also may be configured to write data to the card with a magnetic writer and/or an RFID writer. And the currency dispenser may be any suitable device that is configured to output a specific amount of currency from the ATM 104 per transaction.

In operation, the processor 130, memory 132, input device 134, output device 136, proximal device interface 138, network interface 140, card reader 142, and currency dispenser 142 of the ATM 104 work in conjunction with each other to perform various financial transactions (e.g., withdrawals, deposits, transfers, etc.). For example, a user may authenticate a financial transaction by swiping his/her bank card through or placing his/her bank card in proximity of the card reader 142 and entering a user-selected PIN into the input device 134 (e.g., a key pad). The output device 136 (e.g., a display) then may display a menu and related information associated with the available financial transactions. A portion of that information may be selected and/or additional information may be input into the ATM 104 via the input device 134. The processor 130 may execute the computer program code embodied on the memory 132 to provide the foregoing functionality and to communicate with the provider system 110 of the financial institution that maintains the ATM 104 (e.g., Provider A) via the network interface 124. Based on those communications, an authorization module 182 at the provider system 110 may or may not authorize the requested transaction. If a withdrawal is authorized, the processor 130 will instruct the currency dispenser 144 to dispense currency in the amount of the requested transaction.

According to a non-limiting embodiment of the present disclosure, the functionality of the ATM 104 also may be accessed and implemented with the mobile device 102 by wirelessly communicating with the ATM 104 via its proximal device interface 138. For example, when the mobile device 102 is placed in proximity of the ATM 104, the user may be prompted to establish a wireless connection between the mobile device 102 and the ATM 104 by using the input device 118 of the mobile device 102 and/or the input device 134 of the ATM 104 to select a "Connect to Mobile Device to ATM" option displayed in a menu on the output device 106 of the mobile device 102 and/or the output device 136 of the ATM 104, respectively. After making such a selection, a device PIN (e.g., a four-digit series of human-readable characters) may be displayed on the output device 136 of the ATM 104 and the user may be prompted to input that device PIN into the input device 118 of the mobile device 102. As a result, the mobile device 102 and the ATM 104 establish a relationship by generating a shared link key that is used to establish an authenticated Asynchronous Connection-Less (ACL) link between the mobile device 102 and the ATM 104. The ACL link may be encrypted so that the data exchanged between the mobile device 102 and the ATM 104 is protected against electronic eavesdropping. In that manner, the mobile device 102 and the ATM 104 are paired, or bonded, such that those two devices will recognize and establish an ACL link with each other whenever they are brought in proximity of each other, without the need for the user to re-enter the device PIN.

After the mobile device 102 and the ATM 104 are connected in the foregoing manner, the user may utilize the input device 118 and output device 120 of the mobile device 102, in lieu of the input device 134 and output device 136 of the ATM 104, to conduct financial transactions using the functionality of the ATM 104. And rather than swiping his/her bank card through or placing his/her bank card in proximity of the card reader 142 and entering a user-selected PIN into the input device 134 of the ATM 104, the mobile device 102 may authenticate a financial transaction by transmitting the first verification value of the user's bank card to the ATM 104 via the ACL link using the key wallet module 126 to securely store the encryption key used to encrypt the account information being transmitted via that link. The user also may be prompted to input his/her key PIN, or a user-selected PIN, into the input device 118 of the mobile device 102 to authenticate the financial transaction. Or if the amount of the requested transaction is less than or equal to a predetermined dollar amount (e.g., a "fast cash" withdrawal of $20), the transaction may be authenticated and authorized without the need for a user to input a PIN, similar to a QSR transaction.

The functionality required for a user to utilize the mobile device 102 to interact with the ATM 104 may be provided as part of the payment application 128. As described above, the payment application 128 is configured to include the first verification values for a plurality of different accounts (e.g., bank accounts, credit card accounts, merchant accounts, etc.) that a user may utilize to conduct financial transactions at the ATM 104. The payment application 128 also may pre-authorize, limit, or restrict the type of financial transactions that can be conducted at the ATM 104. For example, the user may utilize the payment application 128 to automatically authenticate and authorize QSR-type transactions for certain amounts, such that the user is not required to enter a user-selected PIN to authenticate the transaction. Instead, the required user-selected PIN will automatically be recovered utilizing trusted computing techniques and provided to the ATM 104 by the mobile device 102 via the ACL link (i.e., trusted software authentication). In the alternative, the payment application 128 may recover one encryption key from a plurality of encryption keys for a particular account, wherein the payment application 128 recovers the encryption key that is designated for such low-risk transactions without the need to input a key PIN or a user-selected PIN, such that possession of that encryption key is sufficient to authenticate the transaction (i.e., multiple key authentication).

Certain PINs are referred to herein as "user-selected" because banks, credit card companies, and merchants often allow users to select their own PINs for accessing accounts so that it will be easier for the user to remember those PINs. And although they are described herein using different nomenclature, the key PINs required to recover a users' encryption keys in the multiple key authentication technique and the access PINs required to access the electronic payment functionality of the mobile device 102 also may be selected by a user so that they are easier to remember. Different nomenclature is adopted to describe those PINs to clarify that those PINs are different from each other and may be used to access different functionality. Nevertheless, a user may select the same series of human-readable characters for each of those PINs such that they at least appear the same.

Instead of or in addition to an ACL link, the mobile device 102 also may communicate with the ATM 104 via any other suitable secure connection, such as via the network connection 112. Moreover, instead of utilizing an ACL link to connect the mobile device 102 to the ATM 104, other wireless technology standards (e.g., IEEE 802.11) also may be utilized to effectuate communication between the mobile device 102 and the ATM 104. The proximal device interface 122 of the mobile device 102 and the proximal device interface 138 of the ATM 104 also may be configured to utilize Near Field Communication (NFC) technology standards (e.g., ISO/IEC 14443) to communicate.

NFC technology standards may be utilized in the same manner as wireless technology, or it may be used in a manner more similar to a smart card. For example, rather than pairing the mobile device 102 with the ATM 104 and operating the ATM 104 via the input device 118 and output device 120 of the mobile device 102, a user may place the mobile device 102 in close proximity to the ATM 104, or the card reader 142 of the ATM 104, such that the mobile device 102 transmits the first verification value to the ATM 104 using the key wallet module 126 to encrypt that account information. The user then may conduct the desired transaction (including inputting a user-selected PIN, if it is required for the desired transaction) using the input device 134 and output device 136 of the ATM 104, rather than the input device 118 and output device 120 of the mobile device 102. Such card-like functionality is described in more detail below with respect to the POS system 106.

Continuing with FIG. 1, the POS system 106 includes a processor 146, a memory 148, an input device 150, an output device 152, a proximal device interface 154, a network interface 156, a card reader 158, a product scanner 160, and a transaction register 162. The processor 146, memory 148, input device 150, output device 152, proximal device interface 154, network interface 156, and card reader 158 of the POS system 106 may be configured in a similar manner to that described above with respect to the processor 114, memory 116, input device 118, output device 120, proximal device interface 122, and network interface 124 of the mobile device 102 and the card reader 142 of the ATM 104, respectively. As would be understood by those of ordinary skill in pertinent art, however, the configurations of the processor 146, memory 148, input device 150, output device 152, proximal device interface 154, network interface 156, and card reader 158 of the POS system 106 may be modified as required to support the functionality of the POS system 106 described below. The POS system 106 also may include a printer (not shown) configured to print transaction receipts.

The product scanner 160 may be any suitable device that is configured to read product information from a tag, a label, or other markings on the product (e.g., an RFID tag reader, a bar code reader, etc.). The product information read by the product scanner 160 may include the price of the product, the type of the product, and any other information required to identify particular product (e.g., product name, product description, manufacturer, stock-keeping unit (SKU), universal product code (UPC), etc.). That product information is utilized by the transaction register 162 to calculate sales totals and taxes, to inventory products, and to provide an accounting of transactions conducted at the POS system 106.

The mobile device 102 may be configured to read product information from a product in a similar manner to the product scanner 160. For example, the proximal device interface 122 of the mobile device 102 may be configured to read product information from an NFC tag on a product and/or the input device 118 of the mobile device 102 (e.g., a camera) may be configured to scan a barcode on a product. Further, the payment application 128 may be configured to calculate sales totals and taxes for products in a similar manner to the transaction register 162, such that the user can determine the total cost of selected products before paying for those products at the POS system 106.

The transaction register 162 may be any suitable device that is configured to handle currency, receive product information, calculate sales totals and taxes, inventory products, and provide an accounting of transactions conducted at the POS system 106. For example, the transaction register 162 may notify the corresponding provider system 110 whenever a product is sold so that the merchant that maintains the POS system 106 will know that there is a need to re-stock the subject product. The transaction register 162 also may notify the corresponding provider system 110 of the sales totals whenever a product is sold so that the merchant that maintains the POS system 106 will be able to track revenue generated at the POS system 106.

In operation, the processor 146, memory 148, input device 150, output device 152, proximal device interface 154, network interface 156, card reader 158, product scanner 160, and transaction register 162 of the POS system 106 work in conjunction with each other to perform various POS transactions (e.g., product purchases, refunds, exchanges, etc.). For example, a merchant may read product information from a plurality of products with the product scanner 160 and provide a total cost of those products based on the sales totals and taxes calculated by the transaction register 162. Some or all of that product information also may be selected from and/or input into the POS system 106 via the input device 150. The output device 152 (e.g., a display) then may display a list of all the items being purchased, their individual sale amounts, and the sales total for a cashier's and/or a customer's review.

If the customer agrees with the total cost, the customer may pay that amount by tendering currency, swiping a card through or placing a card in proximity of the card reader 158, and/or conducting an electronic transaction with the mobile device 102. The processor 146 may execute the computer program code embodied on the memory 148 to provide the foregoing functionality and to communicate with the provider system 110 of the merchant that maintains the POS system 106 (e.g., Provider B) via the network interface 124. Based on those communications, an authorization module 182 at the provider system 110 may or may not authorize the requested transaction.

According to a non-limiting embodiment of the present disclosure, at least some of the functionality of the POS system 106 may be implemented with the mobile device 102 by wirelessly communicating with the POS system 106 via the proximal device interface 154 using wireless and/or NFC technology. For example, when a user enters a retail store, the user may pair his/her mobile device 102 with the POS system 106 in a similar manner to that described above with respect to the ATM 104. After the mobile device 102 and the POS system 106 are connected in that manner, the user may utilize the input device 118 and/or the proximal device interface 122 of the mobile device 102, in lieu of the product scanner 160 output device 152 of the POS system 106, to read product information from various products. The payment application 128 may then calculate sales totals and taxes before providing the product information to the transaction register 162. If the customer agrees to the total cost, the user can purchase the products for that amount by conducting an electronic transaction with the mobile device 102.

A user may authenticate an electronic transaction with the POS system 106 using interactive functionality, as described above with respect to the ATM 104, or using card-like functionality. The card-like functionality of the present disclosure allows the mobile device 102 to be used in a similar manner to a smart card. But rather than the card reader 158 of the POS system 104 reading the first verification value of a card from a magstripe or RFID tag on a card, that account information is transmitted to the POS device 158 via the proximal device interface 122 of the mobile device 102. And rather than using the mobile device 102 to interact with the POS system 104 after that account information is transmitted to the POS system 104, any additional inputs required to authenticate the underlying transaction (e.g., a user-selected PIN, an answer to a security question, a finger print, etc.) may be input via the input device 150 (e.g., a key pad, a finger print scanner, a retinal scanner, etc.). Regardless of whether interactive or card-like functionality is implemented, the payment application 128 may provide any authentication information (e.g., user-selected PINs, key PINs, answers to security questions, etc.) required to recover a user's encryption key without the need for the user to provide any inputs into the mobile device 102 or the POS system 106.

By utilizing software-based keys and key protection techniques, such as cryptographic camouflaging, for multiple key authentication, a user can transmit, distribute, and update those keys electronically as required; a user can duplicate, backup, and collate those keys electronically; and a user can redefine and/or reset those keys electronically. And by utilizing trusted computing techniques for trusted software authentication, a user can ensure that his/her mobile device 102 cannot be emulated to authenticate an electronic transaction using a non-trusted endorsement key. Moreover, the payment application 128 may store information for a plurality of accounts (e.g., bank accounts, credit card accounts, merchant accounts, etc.), such that a user can replace a plurality of different cards (e.g., bank cards, credit cards, merchant cards, etc.) with his/her mobile device 102.

As also illustrated in FIG. 1, the web server 108 includes a processor 164; a memory 166, and a network interface 168. The processor 164, memory 166, and network interface 168 of the web server 108 may be configured in a similar manner to that described above with respect to the processor 114, memory 116, and network interface 124 of the mobile device 102, respectively. As would be understood by those of ordinary skill in the art, however, the configurations of the processor 164, memory 166, and network interface 168 of the web server 108 may be modified as required to support the functionality of the web server 108 described below. The web server 108 also may include an input device (not shown) and an output device (not shown) configured to facilitate user interaction with and control of the functionality of the web server 108. A user also may interact with and control the functionality of the web server 108 via the input device 174 and output device 1176 of the provider system 110 maintained by the merchant that maintains the web server 108 (e.g., Provider C).

In operation, the processor 164, memory 166, and network interface 168 work in conjunction with each other to host a website and facilitate various web-based transactions (e.g., product purchases, refunds, exchanges, etc.). For example, a user may access a merchant's website via a web browser on his/her mobile device 102 and select various products to purchase from the merchant using the input device 118 (e.g., a touch screen) of the mobile device 102. The user may then pay for the selected products by authenticating an electronic transaction with the mobile device 102. That electronic transaction may be similar to the electronic transactions described above with respect to the ATM 104 and the POS system 106, except that the PAN and second verification value may be encrypted and transmitted to the web server 108, rather than the first verification value, because such web-based transactions generally require a PAN and a second verification, rather than a first verification value. Nevertheless, the key wallet module 126 will encrypt that account information in the same manner described above with respect to the ATM 104 and the POS system 106, thereby providing the same level of security and convenience to web-based transactions.

The processor 164 may execute the computer program code embodied on the memory 166 to provide the foregoing functionality and to communicate with the provider system 110 of the merchant that maintains the web server 108 (e.g., Provider C) via the network interface 124. The communications between the mobile device 102 and the web browser 108 are performed via the network interface 124 of the mobile device 102 and the network interface 168 of the web browser 168. Based on those communications, an authorization module 182 at the provider system 110 may or may not authorize the requested transaction.

The key wallet module 126 may operate in the background of the web browser of the mobile device 102, such that the user does not need to open the payment application 128 to facilitate the web-based electronic transaction. The user, however, may still utilize the payment application 128 to define rules to pre-authorize, limit, or restrict the types of web-based transactions that can be conducted with the web server 108.

Still referring to FIG. 1, each provider system 110 includes a processor 170, a memory 172, an input device 174, an output device 176, a network interface 178, an authentication module 180, and an authorization module 182. The processor 170, memory 172, input device 174, output device 176, and network interface 178 of each provider system 110 may be configured in a similar manner to that described above with respect to the processor 114, memory 116, input device 118, output device 120, and network interface 124 of the mobile device 102, respectively. As would be understood by those of ordinary skill in the art, however, the configurations of the processor 170, memory 172, input device 174, output device 176, and network interface 178 of each provider system 110 may be modified as required to support the functionality of that provider system 110 described below.

The authentication module 180 is configured to authenticate the signatures formed by the key wallet module 126 of the mobile device 102 utilizing symmetric encryption techniques, asymmetric encryption techniques, or a combination thereof. More particularly, the authentication module 180 is configured to receive encrypted messages from the mobile device 102 that have been digitally signed utilizing a user's shared encryption key or private encryption key and to decrypt those messages utilizing a corresponding shared encryption key or pseudo-public encryption key, depending on the encryption technique being utilized. And the authorization module 182 is configured to evaluate whether an electronic transaction is authorized based on the transaction information received in those messages. Those messages may be received from the mobile device 102, the ATM 104, the POS system 106, and/or the web server 108.

Returning to FIG. 2, the authentication module 180 is stored on the memory 172 of the corresponding provider system 110. A key generation module 200 is provided that is configured to generate shared encryption keys and/or pairs of private and pseudo-public encryption keys, depending on the encryption technique utilized by the authentication module 180. And when asymmetric encryption techniques are utilized, a certification module 202 also may be provided that is configured to issue pseudo-public key certificates that include the pseudo-public encryption keys generated by the key generation module 200. The certification module 202 may be provided either on the memory 116 of the mobile device 102, the memory 172 of the corresponding provider system 110, or the memory of a certificate server (not shown). The certification module 202 may not be necessary, however, when symmetric encryption techniques are utilized, as indicated by the use of dashed-lines to depict the certification module 202 in FIG. 2.

When the authentication module 180 utilizes symmetric encryption techniques to authenticate the signatures formed by the key wallet module 126 of the mobile device 102, the key generation module 200 generates one or more shared encryption keys for a user when that user creates his/her credentials (e.g., when a user establishes an account with the issuer of the payment credentials) for a particular account. Each shared encryption key is transmitted to the key wallet module 126 of the mobile device 102 and to the authentication module 180 of the corresponding provider system 110 so that the key wallet module 126 may utilize that shared encryption key to form signatures on messages transmitted to that provider system 110 and the provider system 110 may utilize that shared encryption key to authenticate those signatures. Accordingly, each shared encryption key is "shared" between the mobile device 102 and the provider system 110 at which the user of the mobile device 102 has an account associated with that shared encryption key.

When the authentication module 180 utilizes asymmetric encryption techniques to authenticate the signatures formed by the key wallet module 126 of the mobile device 102, the key generation module 200 generates one or more pairs of private and pseudo-public encytpion keys for a user when that user creates his/her credentials for a particular account. The private encryption key is transmitted to the key wallet module 126 of the mobile device 102 and the corresponding pseudo-public encryption key is transmitted to the certification module 202 so that the key wallet module 126 may utilize that private encryption key to form signatures on messages transmitted to that provider system 110 and the certification module 202 may issue a pseudo-public key certificate with the corresponding pseudo-public encryption key to the authentication module 180 of the corresponding provider system 110. The authentication module 180 may then utilize the pseudo-public encryption key provided in that pseudo-public key certificate to authenticate the signatures formed on messages by the key wallet module 126.

The pseudo-public key certificates issued by the certification module 202 are referred to as "pseudo-public" because they are distributed less widely than conventional public keys (e.g., only to the bank, credit card company, or merchant with which the user has the corresponding account). And those certificates contain the pseudo-public encryption keys generated by the key generation module 200, which is why those encryption keys also are referred to as "pseudo-public." Through such limited distribution, the certification module 202 helps the mobile device 102 resist known public key attacks.

Regardless of whether the authentication module 180 utilizes symmetric or asymmetric encryption techniques, key generation may be performed by one or more key generation module 200 provided at one or more of the mobile device 102, a provider system 110, and a third party. For example, a key generation module 200 provided at the mobile device 102 could operate in conjunction with a key generation module 200 provided at a provider system 110 to generate a shared encryption key that is to be shared between those devices. Or a key generation module 200 provided at the mobile device 102 could operate in conjunction with a key generation module 200 provided at a provider system 110 to generate respective pairs of private and pseudo-public encryption keys, such as in a Diffie-Hellman key exchange scheme. Further, a key generation module 200 provided at a third party could be responsible for generating shared encryption keys and/or pairs of private and pseudo-public encryption keys. Moreover, the provider system 110 and/or the third party may store and/or transmit those keys in a secure manner utilizing the same key protection techniques and/or trusted computing techniques as the key wallet component 126.

To support multiple key authentication, the key generation module 200 may generate different shared encryption keys, or different pairs of private and pseudo-public encryption keys, for a particular account. Each of those different encryption keys, or pairs of encryption keys, require different numbers and types of inputs to authenticate different transactions based on the conditions of those transactions and the particular account with which they are associated. Accordingly, each of those different encryption keys, or pairs of encryption keys, may be encrypted/masked with the required numbers and types of inputs by the issuer of the payment credentials (e.g., a bank, a credit card company, a merchant, etc.), by the software that receives them on the mobile device 102, or by a third party so that the correct encryption key can only be recovered with the corresponding numbers and types of inputs.

It should be understood from the foregoing examples that the disclosed embodiments may operate as describe utilizing either symmetric and asymmetric encryption techniques. It also should be understood that the disclosed embodiments also may operate utilizing a combination of those encryption techniques. Thus, while the term "shared encryption keys" is utilized in the foregoing examples to refer to encryption keys that are utilized in symmetric encryption techniques and the terms "private encryption keys" and "pseudo-public encryption keys" are utilized in the foregoing examples to refer to encryption keys that are utilized in asymmetric encryption techniques, the term "encryption key" is used more generally throughout this disclosure to refer to one or both of those encryption techniques.

In addition to authenticating messages received from the mobile device 102 that have been digitally signed utilizing a user's encryption key, the authentication module 180 also may be configured to detect break-in attempts by fraudulent hackers, such as those signing messages with one of the 9,999 incorrect candidate keys that may be generated by the key wallet module 126 of the mobile device 102 utilizing cryptographic camouflaging techniques. In that example, an attacker who tries to crack the key wallet module 126 may recover many plausible candidate keys, but will not be able to distinguish the correct encryption key from the spurious decoys until he tries to use those incorrect candidate keys to access resources via the authentication module 180. Accordingly, when a particular user's signature is not successfully verified by the authentication module 180 in a predetermined number successive attempts based on the attacker's use of those incorrect candidate keys, the authentication module 180 may determine that a break-in is in progress and freeze the user's access privileges pending further investigation.

After the authentication module 180 validates the signature applied to a message, the authorization module 182 evaluates whether an electronic transaction is authorized based on the transaction information in that message or a subsequent message. For example, the authorization module 182 may verify the user's account information, confirm that sufficient funds are available in that account to complete the subject transaction, communicate with the authentication module 180 to verify that the user's authentication information was valid, check for security alerts on the user's account, and generate a transaction authorization result indicating that the subject transaction is authorized. Where security alerts are identified by the authentication module 180 or the authorization module 182, the user may be required to input additional authentication information (e.g., answer a security question) before the transaction is authorized.

The processor 170, memory 172, input device 174, output device 176, network interface 178, authentication module 180, and authorization module 182 of each provider system 110 may be provided in a single computer, in a single server, or distributed across multiple computers and servers. For example, the input device 174 and output device 176 may be provided on a desktop computer with its own processor 170 and memory 172; the network interface 17 may be provided on a web server (e.g., web server 108) with its own processor 170 and memory (e.g., processor 164 and memory 166); the authentication module 180 may be provided on an authentication server with its own processor 170 and memory 172; and the authorization module 180 may be provided on an authorization server with its own processor 170 and memory 172.

A first of the three (3) provider systems 110 illustrated in FIG. 1 (e.g., Provider A) may be maintained by a bank or other financial institution engaged in conducting ATM-based transactions. Accordingly, the processor 170 and memory 172 of that provider system 110 may be configured to support ATM-based transactions, including the authentication and authorization of such transactions. The processor 170 and memory 172 of the first provider system 110 also may be configured to support other financial transactions, such as web-based transactions performed via an internet banking website maintained by the bank.

A second of the three (3) provider systems 110 illustrated in FIG. 1 (e.g., Provider B) may be maintained by a credit card company or other financial institution engaged in conducting credit-based transactions. Accordingly, the processor 170 and memory 172 of that provider system 110 may be configured to support credit-based transactions, including the authentication and authorization of such transactions. For example, the processor 170 and memory 172 of the second provider system 110 may be configured to support the withdrawal of currency from the ATM 104 and credit card purchases at the POS system 106 and web server 108. The withdrawal of currency from the ATM 104 may be conducted through communication between the second provider system 110, the first provider system 110, and the ATM 104 (e.g., between the credit card company, the bank, and the ATM); and credit card purchases at the POS system 106 and web server 108 may be conducted through communication between the second provider system 110, the third provider system 110, and the ATM 104 or POS system 106 (e.g., between the credit card company, the merchant, and the ATM 104 or POS system 106).

A third of the three (3) provider systems 110 illustrated in FIG. 1 (e.g., Provider C) may be maintained by a merchant engaged in selling goods and/or services at one or more retail locations or via a website. Accordingly, the processor 170 and memory 172 of that provider system 110 may be configured to support point-of-sale transactions at those retail locations and/or web-based transactions at those websites, including the authentication and authorization of such transactions. For example, the processor 170 and memory 172 of the third provider system 110 may be configured to support the purchase of products using cash or credit at the POS system 106 and the web server 108. Cash transactions may be conducted through communication between the third provider system 110, the first provider system 110, and the POS system 106 or web server 108 (e.g., between the merchant, the bank, and the POS system 106 or web server 108); and credit transactions may be conducted through communication between the third provider system 110, the second provider system 110, and the POS system 106 or web server 108 (e.g., between the merchant, the credit card company, and the POS system 106 or web server 108).

Each of the foregoing communications between the ATM 104, the POS system 106, the web server 108, and the provider servers 110 is facilitated by the respective network interfaces 140, 156, 168, and 178 of those network devices. The first provider system 110 also may be configured to interface directly with the ATM 104, and the third provider system 110 also may be configured to interface directly with the web server 108, such as through an intranet connection or other dedicated interface, rather than through the network connection 112. And because the mobile device 102 also is configured to communicate with the ATM 104, the POS system 106, the web server 108, and the provider servers 110 via its proximal device interface 122 and/or network interface 124, each of the foregoing transactions may be authenticated with the mobile device 102. For example, a user may utilize his/her mobile device 102 to purchase products from a merchant at the POS system 106 using cash debited from an account that the user has with the bank that maintains the first provider system 110. That example is described in more detail below with respect to FIG. 3.

Figure 3:
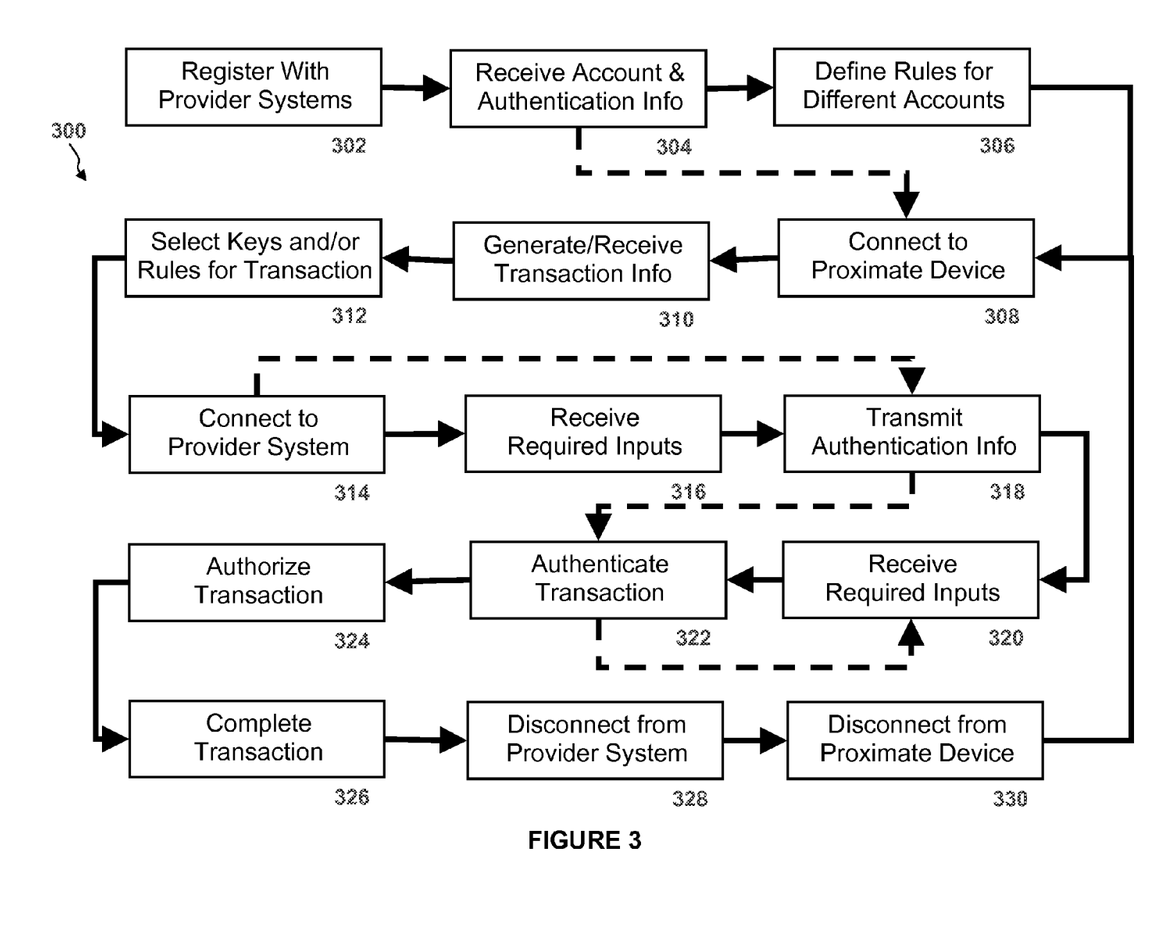
FIG. 3 is a flow diagram illustrating an example of a mobile authentication process according to a non-limiting embodiment of the present disclosure.

FIG. 3 illustrates a mobile authentication process 300 implemented within the communications network of FIG. 1 according to a non-limiting embodiment of the present disclosure. At step 302, a user opens the payment application 128 on the user's mobile device 102 and registers with the provider systems 110. Prior to that step, the user may be required to download the payment application 128 to the mobile device 102 from a trusted vendor through the network connection 112 via its network interface 124. To register with the provider systems 110, the user may be required to input his/her personal information (e.g., name, address, etc.) and account access information (e.g., account name, account number, user name, password, etc.) for each of the accounts that the user has with the bank, credit card company, and merchant that maintain the provider servers 110. During the registration process, the user may select a key PIN that will be used to recover the encryption key for a particular account. The user may have no, one, or multiple accounts with the bank, credit card company, and/or merchant. Accordingly, the user may select one key PIN for all of his/her accounts; different key PINs for each account; different key PINs for the bank, credit card company, and/or merchant, respectively; or any combination thereof.

As the issuers of the payment credentials for the user's various accounts, the bank, credit card company, and/or merchant will provide the payment application 128 with the appropriate account information (e.g., PANs, first verification values, second verification values, etc.) for those accounts at step 304 upon authenticating that the user has access to the subject accounts. That information will be transmitted to the mobile device 102 from the corresponding provider system 110 over the communications network 100 via the network connection 112. Also at step 304, the key generation module 200 will generate one or more shared encryption key (for symmetric encryption) or one or more pair of private and pseudo-public encryption keys (for asymmetric encryption) for each account.

When one or more shared encryption key is generated (i.e., when symmetric encryption is utilized), each such encryption key is transmitted to the key wallet module 126 of the mobile device 102 and the authentication module 180 of the corresponding provider system 110. And when one or more pair of private and pseudo-public encryption keys is generated (i.e., when asymmetric encryption is utilized), the private encryption key is transmitted to the key wallet module 126 of the mobile device 102 and the pseudo-public encryption key is transmitted to the certification module 202, where it is encrypted and written to a pseudo-public key certificate. That pseudo-public key certificate then is transmitted to the authentication module 180 of the corresponding provider system 110. Similarly, a private encryption key also may be transmitted to the authentication module 180 of that provider system 110 with the corresponding pseudo-public key being transmitted to the key wallet module 126 of the mobile device 102 in a pseudo-public key certificate, such as in a Diffie-Hellman key exchange scheme. Step 304 is repeated for each account the user registers with the payment application 128, and for each encryption key generated for that particular account.

To implement multiple key authentication, the key generation module 200 may generate two or more shared encryption keys (for symmetric encryption) or two or more pairs of private and pseudo-public encryption keys (for asymmetric encryption) for each account at step 304 for authenticating different electronic transactions. Each different shared encryption key or pair of private and pseudo-public encryption keys for a particular account is associated with a different electronic transactions that may be conducted with that account based on various conditions, such as an individual transaction amount, an aggregate transaction amount over a predetermined time period, a geographic area, a merchant, a product type, or a particular account. The key generation module 200 encrypts/masks those different encryption keys with the different numbers and types of inputs required to authenticate a transaction based on those various conditions. And at step 312, the payment application 128 selects the appropriate private key based on the conditions of a particular transaction.

At step 306, the user utilizes the payment application 128 to establish different rules for authenticating different electronic transactions via trusted software authentication. For example, a user may establish rules to pre-authorize, limit, or restrict different electronic transactions based on various conditions, such as individual transaction amount, aggregated transaction amount over a particular time period, a geographic area, merchant, a product type, and/or a particular account. The various rules that are defined with the payment application 128 may be associated with user-specific access PINs, wherein a user must enter his/her own access PIN to access the electronic payment functionality of the mobile device 102 such that only certain rules are applied to that user's transactions based on the access PIN entered. Further, different numbers and types of inputs may be required to authenticate different transactions based on the rules associated with those transactions. Those different numbers and types of inputs may be implemented utilizing trusted software on the mobile device 102 to securely store the different types of inputs (e.g., user-selected PINs, key PINs, answers to security questions, etc.) and to automatically recover the different numbers and types of inputs.

When the key generation module 200 issues two or more shared keys or pairs of private and pseudo-public encryption keys for a particular account at step 304, trusted software is not needed to access the different numbers and types of inputs for authenticating different transactions because each transaction will have a different encryption key with a corresponding set of different required inputs. For example, possession of a first encryption key may be enough to authenticate a low-risk transaction (e.g., a transaction at a trusted merchant for an amount less than or equal to a predetermined dollar amount), while the user may be required to enter a key PIN and/or other authenticating information to authenticate a higher-risk transaction associated with a second encryption key (e.g., a transaction at a non-trusted merchant that is above a predetermined dollar amount). In that example, the first encryption key may be stored by the key wallet module 126 without utilizing key protection techniques (e.g., cryptographic camouflaging) because there is lower risk of fraud associated with the corresponding transaction, while the second encryption key may be stored by the key wallet module 126 utilizing key protection techniques techniques because there is a higher risk of fraud associated with the corresponding transaction. The number and types of inputs required to authenticate a transaction with each different encryption key generated for a particular account may increase as the risk of the corresponding transaction increases.

The foregoing multiple key method of authentication eliminates the need for a user to establish different rules for authenticating different financial transactions at step 306. It also eliminates the need for utilizing trusted computing techniques. Accordingly, step 306 of the mobile authentication process 300 may be skipped if multiple key authentication is implemented, as indicated by the dashed-line arrow between step 304 and step 308 in FIG. 3. However, step 306 also may be utilized to supplement multiple key authentication by defining additional, user-specific rules, such as limiting the geographic region and specific merchants at which a particular user can conduct transactions. Moreover, trusted computing techniques also may be utilized to supplement multiple key authentication by securely storing the different types of inputs required by the different encryption keys generated for a particular account (e.g., user-selected PINs, key PINs, answers to security questions, etc.), such that the payment application 128 may automatically provide the different numbers and types of inputs required to authenticate the different electronic transactions that correspond to those different encryption keys.

After setting up the payment application 128 in steps 302-306, the mobile device 102 is placed within the proximity of the POS system 106 and a secure connection is established between the mobile device 102 and the POS system 106 at step 308. For example, a user may enter a retail store with his/her mobile device 102 such that, upon entering the retail store, the user comes within the communication range of the proximal device interface 154 of the POS system 106. The proximal device interface 122 (e.g., a wireless card) of the mobile device 102 then may begin receiving communications from the POS system 106 and the user may be prompted to select a "Connect to POS System" option from a menu displayed on the output device 120 (e.g., a display) of the mobile device 102. When that option is selected, the mobile device 102 establishes a secure connection with the POS system 104 at step 308. Depending on the technology used to make that connection, the user also may be required to enter a password (e.g., Wired Equivalent Privacy (WEP) wireless technology) or a device PIN (e.g., BLUETOOTH brand wireless technology) before the secure connection is established at step 308. But the payment application 128 may be configured to remember passwords and/or PINs for different POS systems 104 so that the user need only enter that connection information the first time a connection is made with a particular POS system 104.

At step 310, product information is input into the transaction register 162 of the POS system 104. That product information may be input directly into the transaction register 162 of the POS system 106, such as by typing SKUs into the input device 150 (e.g., a key pad) of the POS system 106, scanning product labels with the product scanner 160 of the POS system 106, and/or reading tags on products utilizing the card reader 158 of the POS system 106. In addition or in the alternative, product information may be input into the mobile device 102, such as by typing SKUs into the input device 118 (e.g., a key pad) of the mobile device 102, scanning product labels with the input device 120 (e.g., a camera) of the mobile device 102, and/or reading tags on products using the proximal interface device 122 (e.g., an RFID reader) of the mobile device 102. In the latter example, the mobile device 102 may then transmit the product information to the transaction register 162 via the secure connection between the mobile device 102 and the POS system 106. Also in the latter example, the mobile device 102 includes multiple input devices 120 (e.g., a keypad and a camera) and multiple interface devices 122 (e.g., a wireless card and an RFID reader) to support the described functionality.

As part of step 310, the transaction register 162 generates transaction information and transmits that transaction information to the mobile device 102. In addition or in the alternative, the mobile device 102 may be utilized to obtain the product information and the payment application 128 may generate the transaction information at step 310. That transaction information may be transmitted between the mobile device 102 and the POS system 106 via the secure connection established at step 308.

The transaction information defines the conditions of the transaction and may include, for example, the type of each product being purchased (e.g., produce, merchandise, alcohol, etc.), the sales totals and taxes for those products, the identify of the merchant, the location of the retail store (e.g., address, zip code, etc.), and the account the user has selected to use to conduct the underlying transaction (e.g., a particular bank account, a particular credit card account, a particular merchant account, etc.). Accordingly, some of the transaction information may be obtained from the product information (e.g., type of product, product cost, etc.), some of the transaction information may be input by the user (e.g., the particular account to be used for the transaction), and some of the transaction information may be obtained by other techniques. Such other techniques might include, for example, storing the local tax rate and the retail store location in the memory 148 of the POS system 106, transmitting the local tax rate and the retail store location to the mobile device 102 when the mobile device 102 connects to the POS system 106, and/or obtaining the local tax rate and the retail store location utilizing location services on the mobile device 102 (e.g., global positioning system (GPS), cellular triangulation, etc.).

At step 312, the payment application 128 utilizes the transaction information to select the appropriate keys and/or rules for authenticating the underlying transaction. When trusted software authentication is utilized, the payment application 128 applies any rules defined at step 306 to the transaction based on the conditions of the transaction defined by the transaction information. And when multiple key authentication is utilized, the payment application 128 will select the appropriate encryption key required to authenticate the transaction based on the conditions of the transaction defined by the transaction information. The payment application 128 also may apply rules when multiple key authentication is utilized, in addition to any rules that may be defined by the different shared encryption keys or pairs of private and pseudo-public encryption keys. As described above, each rule and/or each key is associated with different numbers and types of inputs that are required to authenticate a particular transaction.

At step 314, the mobile device 102 establishes a secure connection with the corresponding provider system 110. Which provider system 110 that the mobile device 102 connects to depends on the account that the user selects to conduct the underlying transaction. For example, if the user selects an account that he/she has with the bank, the mobile device 102 will connect with the provider system 110 maintained by that bank (e.g., Provider A). And if the user selects an account that he/she has with the credit card company, the mobile device 102 will connect with the provider system 110 maintained by that credit card company (e.g., Provider B). That connection is made directly between the mobile device 102 and the corresponding provider system 110 via the network interface 124 of the mobile device 102 and the network interface 178 of that provider system 110. In addition or in the alternative, the that connection may be made indirectly between the mobile device 102 and the corresponding provider system 110 via the connection between the mobile device 102 and the POS system 106 and the connection between that provider system 110 and that POS system 106.

At step 316, the rules and/or the encryption key selected at step 312 are implemented by the payment application 128, and the user is prompted to provide the required inputs defined by those rules and/or keys, if any, to recover that encryption key and/or authenticate the underlying transaction. When trusted software authentication is utilized and only one encryption key is issued for a particular account at step 304, the payment application 128 may implement the rules defined at step 306 using trusted software to access different authentication information for different transactions. For example, if the transaction is less than or equal to a predetermined dollar amount and with a trusted vendor, the payment application 128 may automatically obtain and utilize a user-selected PIN to recover the encryption key for a particular account such that no input is required at step 316, similar to a QSR transaction. The user may, however, be prompted to manually input the user-selected PIN at step 316 if the transaction is greater than the predetermined dollar amount. And if the transaction is both greater than a predetermined dollar amount and with a non-trusted vendor, the user may be prompted to input the key PIN for the corresponding encryption key and one or more additional inputs (e.g., a second PIN, an answer to a security question, etc.) to authenticate the transaction at step 316. A user also may be required to provide multiple inputs if the authentication module 180 at the corresponding provider system 110 detects the appearance of fraudulent activity (e.g., transactions that depart from a particular pattern, incorrectly entered key PINs, etc.).

When multiple key authentication is utilized, a first encryption key may be selected from among a plurality of encryption keys for a particular account at step 312 because the transaction is less than or equal to a predetermined dollar amount. And a second encryption key may be selected from among a plurality of encryption keys for a particular account at step 312 if the transaction is greater than the predetermined dollar amount. In former example, mere possession of the first encryption key may be enough to authenticate the corresponding transaction such that no input is required at step 316, similar to a QSR transaction. And in the latter example, the user may be prompted to input the key PIN for the second encryption key to authenticate the corresponding transaction at step 316 due to the increased risk associated with that transaction. Further, if a third shared encryption key may be selected from among a plurality of shared encryption keys for a particular account at step 312 because the transaction is both greater than a predetermined dollar amount and with a non-trusted vendor, based on which the user may be prompted to input the key PIN for the corresponding encryption key and one or more additional inputs (e.g., a second PIN, an answer to a security question, etc.) to authenticate the transaction at step 316.

In the foregoing examples of trusted software and multiple key authentication, the numbers and types of inputs generally correspond to the risks associated with the underlying transaction. Also in the foregoing examples of trusted software and multiple key authentication, the user defines the numbers and types of inputs required for trusted software authentication utilizing the payment application 128, whereas the issuers of the different pairs of private and pseudo-public encryption keys define the numbers and types of inputs required for multiple key authentication. Nevertheless, the issuers of the different pairs of private and pseudo-public encryption keys also may define the numbers and types of inputs required for trusted software authentication, such as by embedding rules in trusted software that must be downloaded to the mobile device 102, separately or as part of the payment application 128.

In addition, trusted computing authentication may be utilized to supplement multiple key authentication by automating or adding certain required inputs. For example, if the issuer of different shared encryption keys for a particular account requires a user to input a key PIN for transactions greater than a first dollar amount (e.g., $20) utilizing multiple key authentication, the user may define a rule with the payment application 128 that utilizes trusted software authentication to automatically obtain and utilize that user's key PIN to recover the corresponding encryption key for transactions greater than the first dollar amount, such that no input is required at step 316 to authenticate the underlying transaction. That rule also may include a second, greater dollar amount (e.g., $100) at which the user is required to provide input at step 316, such that the rules defined by the user effectively increase the threshold value for QSR-type transactions (i.e., transactions that are authenticated without input from the user) from the first dollar amount to the second dollar amount. The user also may define rules with the payment application 128 to add additional input requirements to those already defined by the different encryption keys generated for a particular account.

When a particular encryption key and/or the rules defined with the payment application 128 at step 306 do not require user inputs, step 316 of the mobile authentication process 300 may be skipped, as indicated by the dashed-line arrow between step 314 and 318 in FIG. 3. Otherwise, the user provides the inputs required to recover those encryption keys and/or required by those rules at step 316. Those inputs may be provided by the user via the input device 118 (e.g., key pad, a touch screen, a camera, etc.) of the mobile device 102 and/or the input device 150 (e.g., a key pad, a finger print scanner, a retinal scanner, etc.) of the POS system 106. One or more of those inputs also may be provided by the payment application 128 of the mobile device 102 using trusted computing techniques.

At step 318, the key wallet module 126 utilizes the encryption key selected and/or recovered at step 312 to encrypt and digitally sign the transaction information and to transmit the encrypted transaction information to the authentication module 180 of the corresponding system 110, either directly via its network interface 124 or indirectly through the POS system 106 via its proximal device interface 122. The encryption key utilized to encrypt and digitally sign the transaction information may either be a shared encryption key or part of a pair of private and pseudo-public encryption keys that are associated with a particular account. Or when multiple key authentication is utilized, it also may be one shared encryption key or one pair of private and pseudo-public encryption keys from among a plurality of shared encryption keys or pairs of private and pseudo-public encryption keys, respectively, that are associated with a account. In either instance, the appropriate encryption key will be selected by the payment application 128 at step 312.

At step 320, the provider system 110 also may require that the user provide some type of input before the underlying transaction can be authorized. Such input may be required to satisfy any rules defined by the entity that maintains that provider system 110 and/or that cannot be determined until after the provider system 110 receives the encrypted transaction information from the mobile device 102 at step 318. Those inputs may be defined and provided in a similar manner to that described above with respect to step 316. But the provider system 110 also may not require that the user provide any additional inputs after that provider system 110 receives the encrypted transaction information from the mobile device 102 at step 318. In the latter instance, step 320 may be skipped, as indicated by the dashed-line arrow between step 318 and 322 in FIG. 3.

At step 322, the authentication module 180 verifies the digital signature with which the transaction information was encrypted utilizing symmetric or asymmetric decryption techniques. Also at step 322, the authentication module 180 may detect break-in attempts by fraudulent hackers, such as those signing messages with one of the 9,999 incorrect candidate encryption keys that may be generated by the key wallet module 126 of the mobile device 102 if cryptographic camouflaging techniques are utilized to protect the user's encryption keys. If such an attempt is detected and/or if authentication fails at step 322, a security alert may be generated and the mobile authentication process 300 may end at step 322. The user also may be returned to step 320 to make additional inputs (e.g., answer a security question, provide a finger print, etc.) to authenticate the transaction, as indicated by the dashed-line arrow between step 322 and 320 in FIG. 3.

At step 324, the authorization module 182 evaluates whether an electronic transaction should be authorized based on the transaction information received from the ATM 104, the POS system 106, or the web server 108. For example, the authorization module 182 may verify the user's account information, confirm that sufficient funds are available in that account to complete the underlying transaction, communicate with the authentication module 180 to verify that the user's authentication information was valid, check for security alerts on the user's account, and generate a transaction authorization result indicating that the subject transaction is authorized.

At step 326, the transaction is completed. Completing the transaction may include transferring funds from one account to another. For example, the provider system 110 maintained by the bank at which the user has the subject account (e.g., Provider A) may communicate with the provider system 110 maintained by the merchant that corresponds to the POS system 106 at which the transaction took place (e.g., Provider C) to effectuate a transfer of funds from the user's account to the merchant's account. Also at step 326, a transaction record may be generated for the underlying transaction. The transaction record may be provided in paperless form directly to the mobile device 102, such as via an electronic mail (e-mail) or short message service (SMS) text message, or it may be provided in paper form, such as via a paper receipt.

At step 328, the mobile device 102 and/or the POS system 106 disconnect from the corresponding provider system 328. And at step 330 the mobile device 102 disconnects from the POS system 106. The mobile device 102 may automatically disconnect from the POS system 104 when the mobile device 102 leaves the proximity of the POS system 106, or the user may be prompted to disconnect the mobile device 102 from the POS system 106 at the conclusion of the transaction, such as via a selectable "Disconnect from POS System" option. A new connection may subsequently be established with the POS system 106 at step 308 and a new mobile authentication process 300 started from that point by repeating steps 308-330, such as by placing the mobile device 102 back in the proximity of the POS system 106.

Although the mobile authentication process 300 illustrated in FIG. 3 is described primarily with respect to authenticating a transaction conducted at a POS system 106, a similar process may be implemented to authenticate transactions with the mobile device 102 at the ATM 104, the web browser 108, or another mobile device 102. For example, the mobile device 102 may connect to the ATM 104 to withdraw currency based on credit from a credit card account that the user has with a credit card company; it may connect to the web server 108 to purchase merchandise on a website maintained by a merchant; or it may connect to another mobile device 102 to transfer funds from one user's bank account to another user's bank account. In the first example, the transaction may be completed at step 326 via communications between the provider system 110 maintained by the bank that maintains the ATM 104 (e.g., Provider A) and the provider system 110 maintained by the credit card company (e.g., Provider B). In the second example, the transaction may be completed at step 326 via communications between the provider system 110 maintained by the bank with which the user has the account being used to purchase goods from the merchant (e.g., Provider A) and the provider system 110 maintained by the merchant selling the goods (e.g., Provider C). And in the third example, the transaction may be completed at step 326 via communications between the provider system 110 maintained by a first bank with which a first user has an account (e.g., Provider A) and a provider system 110 maintained by a second bank with which a second user has an account, a credit card company with which the second user has an account, or a merchant with which the second user has an account (not shown).

In addition, although the mobile authentication process 300 of FIG. 3 is primarily described in terms of interactive functionality, the mobile device 102 also may be used in payment processes that utilize card-like functionality. For example, the mobile device 102 may implement NFC technology to transmit the required authentication information to the card reader 142 of the POS system 106 when the mobile device 102 is placed in close proximity of the card reader 142, wherein any additional inputs may be input via the input device 152 of the POS system 106 rather than via the input device 118 of the mobile device 102. Accordingly, the mobile device 102 could be used more like a card than an interactive device. And although the foregoing embodiments are described primarily in terms of wireless connections made using proximal device interfaces, it should be understood that those connections also may be made using physical, wired, or contact interfaces, such as Universal Serial Bus (USB) interfaces, SIM card interfaces, and/or other types of wired, cabled, or pluggable connections.

Regardless of the type of account, functionality, or connection that is used to authenticate a transaction with the mobile device 102, the payment application 128 may utilize trusted software authentication, multiple key authentication, or a combination of those mobile authentication techniques to ensure the security of the communications required to effectuate those transactions. Those mobile authentication techniques also provide the added convenience of defining the numbers and types of inputs required to authenticate the underlying transaction while, at the same time, automating one or more of those inputs. For example, trusted software authentication or multiple key authentication can be utilized to automatically authenticate certain transactions conducted with the mobile device 102 in a similar manner to QSR transactions. The mobile device 102, however, eliminates many of the problems associated with smart cards by recovering the providing the required authentication information utilizing trusted computing techniques and/or by providing the required authentication in software, rather than hardware, utilizing cryptographic camouflaging techniques.

QSR transactions operate on two assumptions: 1) the customer in possession of the subject credit card or debit card is the authorized cardholder and 2) the authorized dollar amount is so low that a thief is unlikely to risk using a stolen credit card or debit for such a small transaction. Those assumptions generally depend on the individual user. For example, certain users may be more likely than others to misplace their mobile devices, just as certain users may be more vigilant than others in monitoring their various accounts. Accordingly, certain users may want to pre-authorize larger amounts than others for QSR-type transactions. By allowing users to set or modify that limit utilizing trusted computing techniques, the payment application 128 of the disclosed embodiments allows user to balance the convenience of such transactions and their comfort level with the pre-authorized amount.

Further, although the foregoing embodiments are described primarily with respect to authenticating financial transactions conducted with mobile device 102, it should be understood that similar embodiments may be utilized in a similar manner to perform other types of authentication. For example, similar embodiments may be utilized to authenticate a user for access to different rooms in a facility, such as by utilizing the card-like functionality of the foregoing embodiments to gain access to different rooms by placing the mobile device 102 in close proximity of a card reader at a door to a room. Similar embodiments also may be utilized to authenticate a user for access to different Internet websites and/or files on his/her mobile device.

The schematic and flow diagrams in FIGS. 1-3 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus for providing two or more levels of authentication for a transaction, the apparatus comprising:
   a user interface;
   a processor; and
   a memory storing executable instructions, that, when executed by the processor, cause the processor to perform the steps of:
   storing authentication information, a first encryption key associated with a first level of authentication, and a second encryption key associated with a second level of authentication;
   receiving transaction information;
   determining that the first level of authentication is required for the transaction and, based on the determination, recovering the first encryption key;
   determining that a second level of authentication is required for the transaction and, in response, requesting a first input via the user interface;
   receiving the first input via the user interface;
   comparing the received first input to the authentication information;
   determining that the authentication information is different than the first input;
   generating an incorrect encryption key based on the first input being different than the authentication information, wherein the incorrect encryption key is different than the second encryption key;
   signing the transaction information using the incorrect key;
   transmitting the signed transaction information to a server;
   receiving a message from the server and, based on the message, requesting a second input via the user interface;
   receiving the second input into the user interface and transmitting the second input to the server; and
   authenticating the transaction.

2. The apparatus of claim 1, wherein:
the authentication information is a correct key PIN;
the executable instructions, when executed by the processor, cause the processor to perform the further steps of:
encrypting the second encryption key under the correct key PIN; and
generating the incorrect encryption key when an incorrect key PIN is received as the input; and
the second encryption key, prior to decryption, and the incorrect encryption key have the same data structure.

3. The apparatus of claim 2, wherein:
the executable instructions, when executed by the processor, cause the processor to perform the further step of:
determining the input required for the second level of authentication based on a transaction condition; and
the transaction condition comprises at least one of an individual transaction amount, an aggregate amount over a predetermined time period, a geographic area, a merchant, a product type, and a particular account.

4. The apparatus of claim 2, wherein:
the first level of authentication corresponds to a financial transaction that is less than or equal to a predetermined transaction amount; and
the second level of authentication corresponds to a financial transaction that is greater than the predetermined transaction amount.

5. The apparatus of claim 1, wherein the executable instructions, when executed by the processor, cause the processor to perform the further steps of:
requesting an other input via the user interface of the apparatus when the second level of authentication is required;
receiving input of a correct other input via the user interface of the apparatus; and
recovering the second encryption key when the correct other input is received.

6. The apparatus of claim 1, wherein:
the apparatus further comprises an endorsement key that is provided in hardware of the apparatus and that is shared with trusted software; and
the executable instructions, when executed by the processor, cause the processor to perform the further steps of:
encrypting the second encryption key utilizing the endorsement key; and
recovering the endorsement key when the first input that is received is the same as the authentication information and recovering and decrypting the second encryption key with the endorsement key when the second encryption key is requested by the trusted software.

7. The apparatus of claim 6, wherein the executable instructions, when executed by the processor, cause the processor to perform the further steps of:
Encrypting a third encryption key associated with a third level of authentication utilizing the endorsement key; and
requesting a further input, recovering the endorsement key when the further input is received
requesting a further input, recovering the endorsement key when the further input is received, and recovering and decrypting the third encryption key with the endorsement key when the third encryption key is requested by the trusted software.

8. The apparatus of claim 7, wherein:
the first level of authentication corresponds to a financial transaction that is less than or equal to a predetermined transaction amount;
the second level of authentication corresponds to a financial transaction that is greater than the predetermined transaction amount; and
the third level of authentication corresponds to a financial transaction that is greater than the predetermined transaction amount and at least one of a non-trusted time period, a non-trusted geographic area, a non-trusted merchant, a non-trusted product type, and a non-trusted account.

9. A method for providing two or more levels of authentication for a transaction comprising:
storing, on a device, authentication information, a first encryption key associated with a first level of authentication, and a second encryption key associated with a second level of authentication;
receiving, by the device, transaction information for the transaction;
determining, by the device, that the first level of authentication is required for the transaction and, based on the determination, recovering the first encryption key with a processor of the device;
determining, by the device, that a second level of authentication is required for the transaction and, in response, requesting a first input via a user interface of the device;
receiving the first input via the user interface of the device;
comparing, by the device, the received first input to the authentication information;
determining, by the device, that the authentication information is different than the first input;
generating, by the device, an incorrect encryption key based on the first input being different than the authentication information, wherein the incorrect encryption key is different than the second encryption key;
signing, by the device, the transaction information using the incorrect key;
transmitting the signed transaction information to a server;
receiving, by the device, a message from the server, and based on the message, requesting, by the device, a second input via the user interface;
receiving, by the device, the second input into the user interface and transmitting, by the device, the second input to the server;
authenticating, by the device, the transaction.

10. The method of claim 9, wherein:
the authentication information is a correct key PIN;
the method further comprises:
encrypting the second encryption key under the correct key PIN; and
generating incorrect encryption key when an incorrect key PIN is received as the input; and
the second encryption key, prior to encryption, and the incorrect encryption key have the same data structure.

11. The method of claim 10, further comprising determining the input required for the second level of authentication based on a transaction condition, wherein the transaction condition comprises at least one of an individual transaction amount, an aggregate amount over a predetermined time period, a geographic area, a merchant, a product type, and a particular account.

12. The method of claim 10, wherein:
the first level of authentication corresponds to a financial transaction that is less than or equal to a predetermined transaction amount; and
the second level of authentication corresponds to a financial transaction that is greater than the predetermined transaction amount.

13. The method of claim 9, further comprising:
requesting an other input via the user interface of the device when the second level of authentication is required;
receiving input of a correct other input via the user interface of the device; and
recovering the second encryption key when the correct other input is received.

14. The method of claim 9, further comprising:
providing an endorsement key in hardware of an apparatus that is shared with trusted software; and
encrypting the second encryption key utilizing the endorsement key,
wherein recovering the second encryption key comprises recovering the endorsement key when the first input that is received is the same as the authentication information and recovering and decrypting the second encryption key with the endorsement key when the second encryption key is requested by the trusted software.

15. The method of claim 14, wherein the method further comprises:
encrypting a third encryption key associated with a third level of authentication utilizing the endorsement key; and
requesting a further input, recovering the endorsement key when the further input is received, and recovering and decrypting the third encryption key with the endorsement key when the second encryption key is requested by the trusted software.

16. The method of claim 15, wherein:
the first level of authentication corresponds to a financial transaction that is less than or equal to a predetermined transaction amount;
the second level of authentication corresponds to a financial transaction that is greater than the predetermined transaction amount; and
the third level of authentication corresponds to a financial transaction that is greater than the predetermined transaction amount and at least one of a non-trusted time period, a non-trusted geographic area, a non-trusted merchant, a non-trusted product type, and a non-trusted account.

17. A computer program product, for authenticating a transaction, comprising a non-transitory computer-readable storage medium having computer-readable program code that, when executed by a processor, causes the processor to perform the steps of:
storing authentication information, a first encryption key associated with a first level of authentication, and a second encryption key associated with a second level of authentication;
receiving transaction information;
determining that the first level of authentication is required for the transaction and, based on the determination, recovering the first encryption key; and
determining that a second level of authentication is required for the transaction and, in response, requesting a first input via a user interface;
receiving the first input via the user interface;
comparing the received first input to the authentication information;
determining that the authentication information is different than the first input;
generating an incorrect encryption key based on the first input being different than the authentication information, wherein the incorrect encryption key is different than the second encryption key;
signing the transaction information using the incorrect key;
transmitting the signed transaction information to a server;
receiving a message from the server and, based on the message, requesting a second input via the user interface;
receiving the second input into the user interface and transmitting the second input to the server; and
authenticating the transaction.

18. The computer program product of claim 17, wherein:
the authentication information is a correct key PIN;
the computer-readable program code, when executed by the processor, causes the processor to perform the further steps of:
encrypting the second encryption key under the correct key PIN; and
generating the incorrect encryption key when an incorrect key PIN is received as the input; and
the second encryption key, prior to encryption, and the incorrect encryption key have the same data structure.

19. The computer program product of claim 18, the computer program product further comprising computer-readable program code that, when executed by the processor, causes the processor to perform the further step of determining the input required for the second level of authentication based on a transaction condition, wherein the transaction condition comprises at least one of an individual transaction amount, an aggregate amount over a predetermined time period, a geographic area, a merchant, a product type, and a particular account.

20. The computer program product of claim 18, wherein:
the first level of authentication corresponds to a financial transaction that is less than or equal to a predetermined transaction amount; and
the second level of authentication corresponds to a financial transaction that is greater than the predetermined transaction amount.

21. The computer program product of claim 17, wherein the computer-readable program code, when executed by the processor, causes the processor to perform the further steps of:
requesting an other input via the user interface when the second level of authentication is required;
receiving input of a correct other input via the user interface; and
recovering the second encryption key when the correct other input is received.

22. The computer program product of claim 17, wherein the computer-readable program code, when executed by the processor, causes the processor to perform the further steps of:
encrypting the second encryption key utilizing an endorsement key that is provided in hardware of an apparatus and that is shared with trusted software,
recovering the endorsement key when the first input that is received is the same as the authentication information and recovering and decrypting the second encryption key with the endorsement key when the second encryption key is requested by the trusted software.

23. The computer program product of claim 22, wherein the computer-readable program code, when executed by the processor, causes the processor to perform the further steps of:
storing a first encryption key associated with the first level of authentication without utilizing the endorsement key to encrypt the first encryption key;
recovering the first encryption key for the first level of authentication when the one or more encryption key is requested by the trusted software; and
requesting a further input, recovering the endorsement key when the further input is received, and to recovering and decrypting the second encryption key with the endorsement key for a second level of authentication when the one or more encryption key is requested by the trusted software.

24. The computer program product of claim 23, wherein:
the first level of authentication corresponds to a financial transaction that is less than or equal to a predetermined transaction amount;
the second level of authentication corresponds to a financial transaction that is greater than the predetermined transaction amount; and
the third level of authentication corresponds to a financial transaction that is greater than the predetermined transaction amount and at least one of a non-trusted time period, a non-trusted geographic area, a non-trusted merchant, a non-trusted product type, and a non-trusted account.

* * * * *